United States Patent
Mensch (10) Patent No.: US 9,297,188 B2
(45) Date of Patent: Mar. 29, 2016

(54) LATCH ASSEMBLY FOR MOTOR VEHICLE DOORS, SEATS, OR BACKRESTS WITH ANTI-RATTLE FUNCTION

(71) Applicant: WITTE Automotive GmbH, Velbert (DE)

(72) Inventor: Reinaldo Mensch, Wuppertal (DE)

(73) Assignee: WITTE AUTOMOTIVE GMBH, Velbert (DE)

(*) Notice: Subject to any disclaimer, the term of this patent is extended or adjusted under 35 U.S.C. 154(b) by 108 days.

(21) Appl. No.: 13/959,886

(22) Filed: Aug. 6, 2013

(65) Prior Publication Data

US 2014/0037371 A1 Feb. 6, 2014

(30) Foreign Application Priority Data

Aug. 6, 2012 (DE) .......................... 10 2012 107 185

(51) Int. Cl.
| | | |
|---|---|---|
| *B60N 2/015* | (2006.01) | |
| *E05C 3/30* | (2006.01) | |
| *E05B 85/26* | (2014.01) | |
| *B60N 2/36* | (2006.01) | |

(52) U.S. Cl.
CPC .............. *E05C 3/30* (2013.01); *B60N 2/01583* (2013.01); *B60N 2/366* (2013.01); *E05B 85/26* (2013.01); *Y10T 403/593* (2015.01); *Y10T 403/595* (2015.01); *Y10T 403/60* (2015.01); *Y10T 403/604* (2015.01); *Y10T 403/608* (2015.01)

(58) Field of Classification Search
CPC .......... E05C 3/002; E05C 3/30; F16B 7/0473; B60N 2/01541; B60N 2/01583

USPC ........ 403/322.1, 322.3, 325–328, 330, 322.4; 296/65.03; 297/378.13

See application file for complete search history.

(56) References Cited

U.S. PATENT DOCUMENTS

| | | | | |
|---|---|---|---|---|
| 4,632,595 | A | * 12/1986 | Schaeff | ......................... 403/330 |
| 5,714,692 | A | 2/1998 | Rohde | |
| 6,945,585 | B1 | * 9/2005 | Liu et al. | ..................... 296/65.03 |
| 7,032,973 | B2 | * 4/2006 | Reubeuze | ................ 297/378.13 |
| 7,243,974 | B2 | * 7/2007 | Kondo et al. | ............... 296/65.03 |
| 7,367,604 | B2 | * 5/2008 | Miller et al. | ................ 296/65.03 |
| 7,431,371 | B2 | * 10/2008 | Miller et al. | ................ 296/65.03 |

(Continued)

FOREIGN PATENT DOCUMENTS

| | | |
|---|---|---|
| DE | 19639051 | 3/1998 |
| DE | 10202344 | 4/2003 |

(Continued)

*Primary Examiner* — Josh Skroupa
(74) *Attorney, Agent, or Firm* — Lucas & Mercanti, LLP; Klaus P. Stoffel (57) ABSTRACT

A latch assembly especially for the doors, seats, or seatbacks of motor vehicles with a latch element installed rotatably in a lock housing to retain an opposing latch part when the assembly is in the locking position, which opposing part can disconnect itself from the latch element when the assembly is in a released position. A tensioning element exerts a tensioning force when the assembly is in the locking position, by which a tension edge forming a permanent part of the opposing latch part is pressed against an opposing tension edge forming a permanent part of the lock housing. The tensioning member is a slide plate supported on a guide edge of the lock housing and a certain area of the plate forms a tensioning cam, which is at an angle relative to the movement of the slide plate and which cooperates with a projection on the latch element.

8 Claims, 9 Drawing Sheets

(56) References Cited

U.S. PATENT DOCUMENTS

| | | | | |
|---|---|---|---|---|
| 7,959,205 | B2* | 6/2011 | Paing et al. | 296/65.03 |
| 8,282,141 | B2* | 10/2012 | Paing et al. | 297/336 |
| 8,333,530 | B2* | 12/2012 | Omori | 403/330 |
| 8,763,979 | B2* | 7/2014 | Blake et al. | 296/65.03 |
| 2010/0032967 | A1* | 2/2010 | Otsuka | 292/240 |
| 2013/0129413 | A1* | 5/2013 | Dryburgh et al. | 403/316 |

FOREIGN PATENT DOCUMENTS

| | | |
|---|---|---|
| DE | 10156200 | 6/2003 |
| DE | 10343622 | 4/2005 |
| DE | 102005023861 | 2/2006 |
| DE | 102004051894 | 4/2006 |
| DE | 102006019347 | 11/2006 |
| DE | 102005029079 | 1/2007 |
| DE | 102009003706 | 10/2010 |

* cited by examiner

LATCH ASSEMBLY FOR MOTOR VEHICLE DOORS, SEATS, OR BACKRESTS WITH ANTI-RATTLE FUNCTION

CROSS-REFERENCE TO RELATED APPLICATIONS

The present application claims priority of DE 10 2012 107 185.3, filed Aug. 6, 2012, the priority of this application is hereby claimed and this application is incorporated herein by reference.

BACKGROUND OF THE INVENTION

The invention pertains to a latch assembly especially for the doors, seats, or backrests of motor vehicles with a latch element installed rotatably in a lock housing to retain an opposing latch part when the assembly is in the locking position, which opposing part can disconnect itself from the latch element when the assembly is in a released position; and with a tensioning element, which, when the assembly is in the locking position, exerts a tensioning force by which a tension edge forming a permanent part of the opposing latch part is pushed against an opposing tension edge forming a permanent part of the lock housing.

DE 10 2005 023 861 A1 describes a rotary latch assembly, in which the rotary latch is held in a locking position by a stop pawl. The stop shoulder of the stop pawl forms a wedge surface which exerts a tensioning force on the rotary latch under the action of a pawl spring, this force pressing the opposing latch part captured in the forked opening of the rotary latch against an opposing tension edge forming a permanent part of the housing. The tension edge is formed in this case by an upper surface section of the opposing latch part situated in the forked opening.

DE 10 2005 029 079 A1 describes a similar latch assembly. Here the tensioning element is designed so that it exerts a tensioning force on the opposing latch part. DE 10 2004 051 894 A1 also describes a tensioning member which acts directly on the opposing latch part in such a way as to push it against an opposing tension edge forming a permanent part of the housing.

In the case of the latch assembly described in DE 102 02 344 A1, it is proposed that a tensioning section of the stop pawl be able to move between the inside edge of the forked opening and the opposing latch part and thus exert a clamping action.

In the case of the latching assembly described in DE 196 39 051, the opposing latch part is clamped between a tension edge of a stop arm of the rotary latch and a tensioning member.

DE 10 2009 003 706 A1 describes a seatback latching assembly with a rotary latch and a tensioning element. The tensioning element is a slider with a wedge-shaped component. A latch assembly with a tensioning slider with a wedge-shaped component is also disclosed in DE 10 2006 019 347 A1. In the case of the rotary latch assembly described in DE 101 56 200 A1, the exertion of a tensioning force on the rotary latch has the effect of clamping an opposing latch part between the bottom of a capture slot and a fork arm. The tensioning force is applied by a rotating wedge, which is able to turn around a rotational axis forming a permanent part of the housing.

DE 103 43 622 discloses a latch assembly with a pivot lever, which is supported on one of the arms of a rotary latch, and which comprises a wedge-shaped component, by means of which an opposing latch part can be pushed against the other arm of the rotary latch.

SUMMARY OF THE INVENTION

The invention is based on the goal of elaborating the latch assembly of the general type in question in a manner which offers advantages with respect to practical application.

The goal is achieved by the invention described in the claims. What is provided first and essentially is that the tensioning member is a slide plate, which is supported on a guide edge of the lock housing, at least a certain area of the slide plate forming a tensioning cam which is at an angle in relation to the movement of the slide plate and which cooperates with a projection on the latch element. In preferred elaborations, which also have independent character, it is provided that the tensioning cam is the boundary edge of a window, especially of a completely enclosed window, in the tensioning member. The window can form an escape space, which follows after the control cam and in which the projection, which cooperates with the tensioning cam to apply the tensioning force, lies when the latch is in the released position. For guidance in the housing, the tensioning member can comprise a slot. A guide pin can engage in this slot. The guide pin can be a projection forming a permanent part of the housing. Preferably, however, the guide pin is designed as a rivet, which serves as a bearing to support the latch element, preferably designed as a rotary latch. The width of the slot corresponds here to the diameter of the hub. The lock can also form a stop pawl, the stop hook of which extends under a stop edge of the latch element when the assembly is in the locking position. When the assembly is under tension, the stop hook can be a certain distance away from the stop edge. The job of the stop pawl can be limited to that of rendering the latching assembly crash-proof. If, for example, the force of an impact causes the tensioning member to shift into the released position, the anti-rattle function is, of course, no longer guaranteed. It is still impossible, however, for the rotary latch to move into its open position, because the stop hook on the stop pawl prevents it from doing so. Only after both the tensioning member and the stop pawl have been moved into their released positions is the rotary latch free to open. This can be done by means of a pretensioned rotary latch spring, which is put under tension when the latch assembly is closed, i.e., when the opposing latch part is captured by the rotary latch. So that this opening process can proceed as intended, an opening lever can be provided. This lever is free to rotate around an opening-lever rotational axis forming a permanent part of the housing. The rotational axis of the opening lever can be the same as the rotational axis of the stop pawl. The opening lever has a first arm. During the pivoting movement of the opening lever in the opening direction, which can be accomplished by pulling on a Bowden cable, for example, the first arm of the opening lever acts on a projection of the tensioning member in such a way as to shift the tensioning member from the tensioning position into a released position. As this is happening, the tensioning member slides along the guide edge forming a permanent part of the housing until the pin of the rotary latch has left the stop edge and has entered the escape space. A second arm of the opening lever cooperates with a driver on the stop pawl. It exerts force on the driver in such a way as to shift the stop pawl out of its stopping position and into the released position. A third arm can be provided, on which the Bowden cable or a linkage acts, the cable or linkage being connected to an actuating lever or the like. The tensioning force can be applied by a tension spring. One end of this tension spring is fastened to a spring support forming a permanent part of the housing. The other end acts on the tensioning member.

In a preferred embodiment of the invention, which has independent character apart from the design of the tensioning member, it is provided that the opposing tensioning edge is formed by a wall of the housing. The tensioning edge can be designed as a latch member carrier. The tensioning edge can also be formed by the latch member itself, and the opposing tensioning edge can be formed by the bottom of a capture opening in the lock housing. In the preferred embodiment, a tensioning edge of the lock housing moves against an opposing tensioning edge of an opposing latch part carrier during the final phase of the latching movement, i.e., when the door is being closed, the seat is being fastened to the floor of the vehicle body, or the seatback is being raised. These two edges are pressed against each other by the tensioning force of the tensioning member, that is, by the spring acting on the tensioning member.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
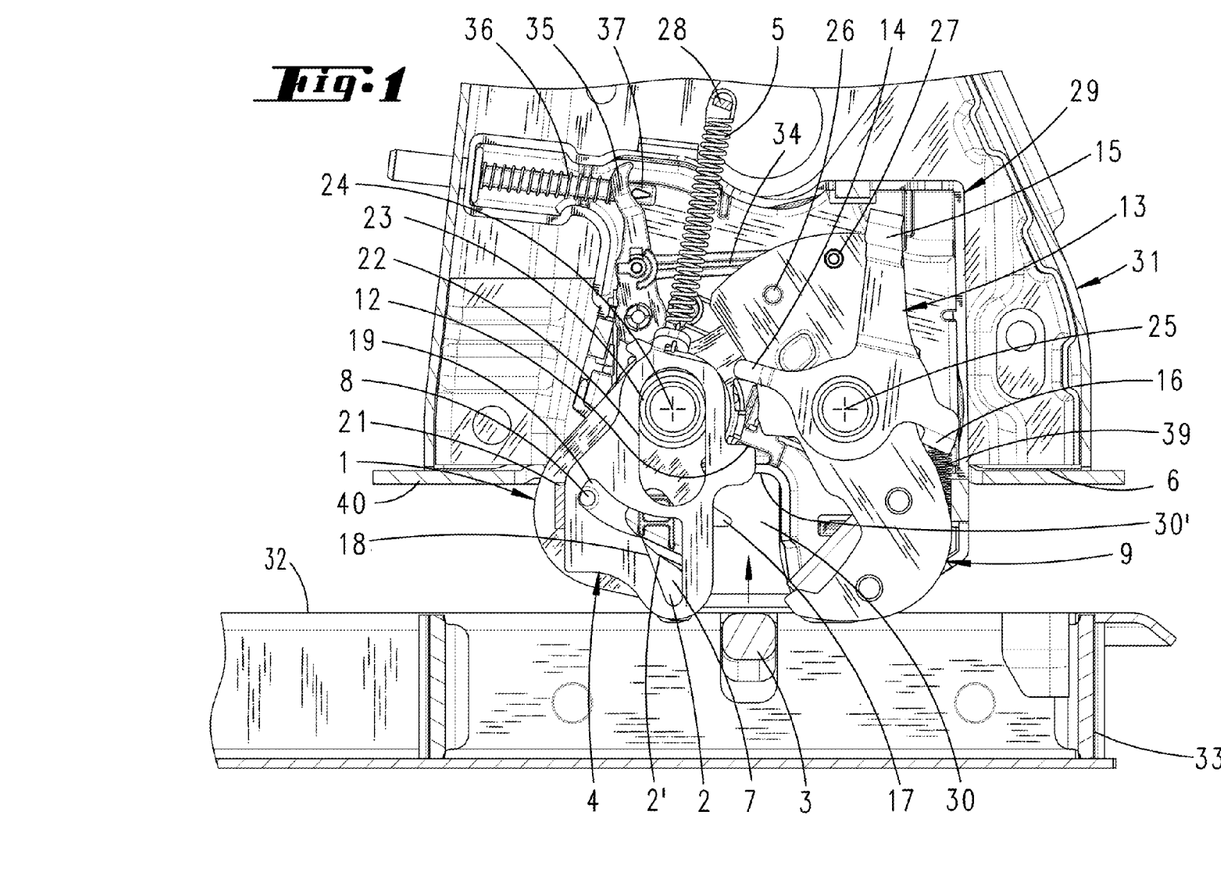
FIG. 1 shows the latching assembly in the open position, in which the rotary latch has assumed a pivoted position in which it can capture an opposing latch part.
Figure 5:
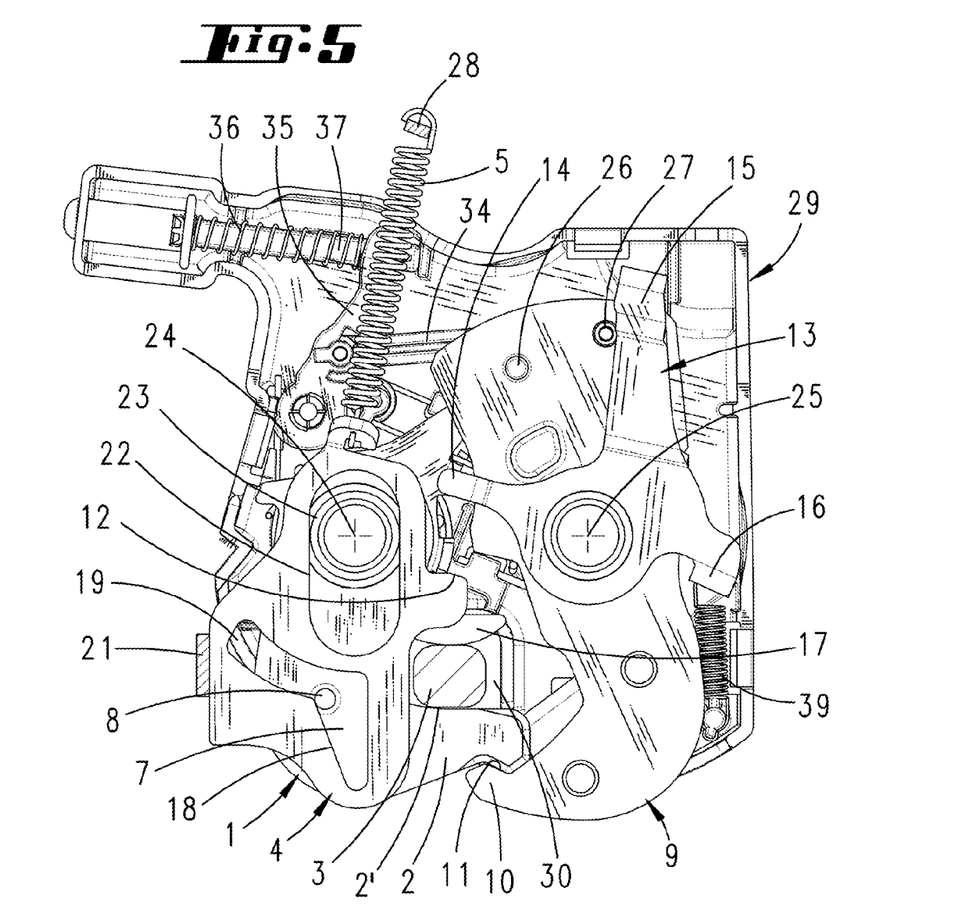
FIG. 5 shows a diagram subsequent to the preceding one, wherein the pin 8 has reached the tensioning cam 18, the opposing latch part carrier 33 and the lock housing 31 again being omitted.

The lock shown in the drawings has an outer lock housing 31, which carries in turn a housing plate 29, certain parts of which project beyond a boundary edge 6 of the lock housing 31. One edge 6 of the lock housing 31 forms an opposing tensioning edge. The opposing tensioning edge can be formed by a base plate 40, which is permanently connected to the lock housing 31. The opposing tensioning edge 6 is parallel to a tensioning edge 32, which is assigned to a latch member carrier 33, which carries a latch member 3. Latch member carrier 33, housing plate 29, and lock housing 31 can be made of steel. In an open position of the latch assembly, which is shown in FIG. 1, the tensioning edge 32 and the opposing tensioning edge 6 are a certain distance apart. In a latching position, which is shown in FIG. 5, the opposing tensioning edge 6 and the tensioning edge 32 are resting flat against each other and are being pressed together by the tensioning force of a tension spring 5, so that the latching part is held against the latch member 3 or latch member carrier by a solid, rattle-free connection.

Figure 9:
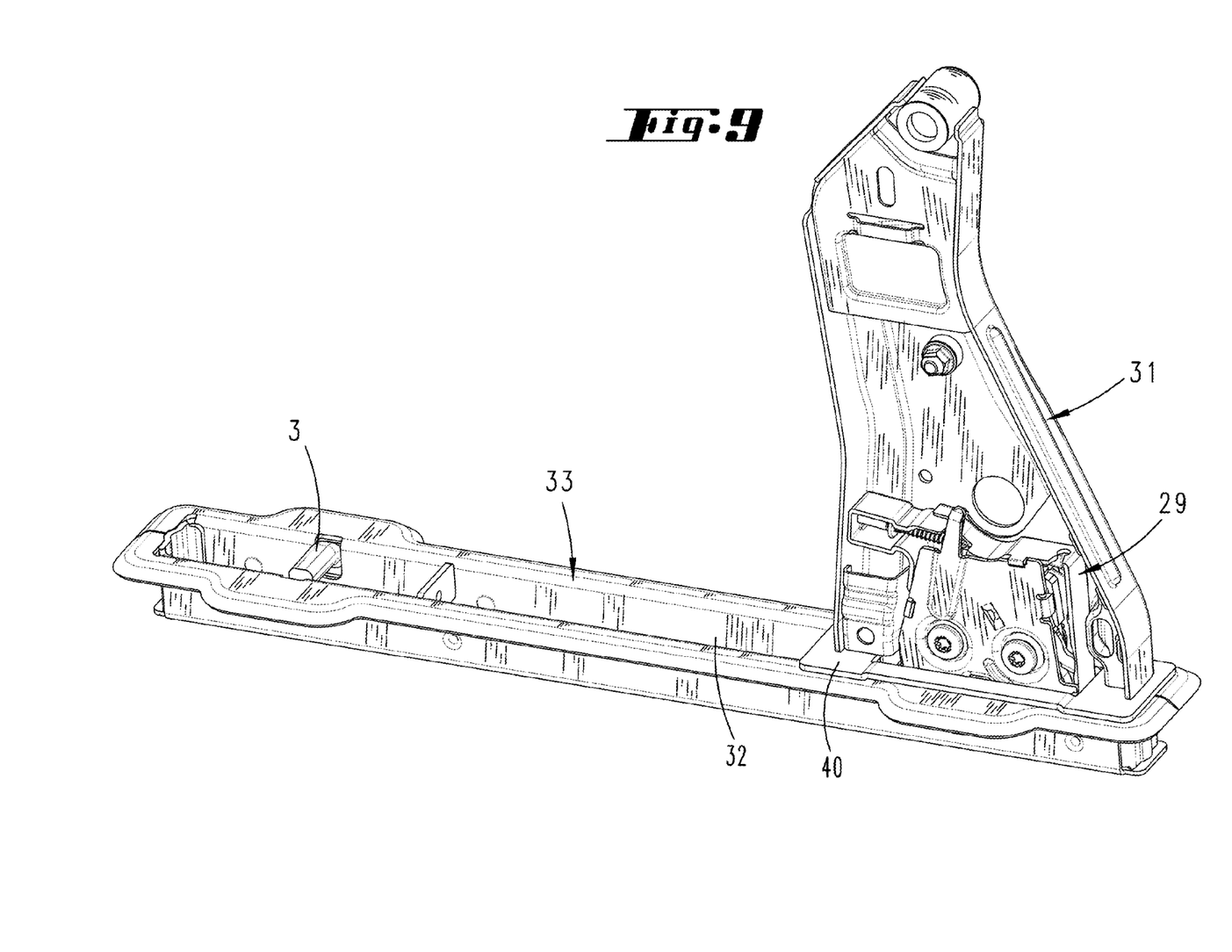
FIG. 9 shows a perspective view of the complete latch member carrier 33 and the complete lock housing 31 in the locking position.

The latch assembly is shown in its entirety in FIG. 9. It is a floor latch assembly, by means of which a motor vehicle seat can be fastened to the floor of a passenger compartment forming a permanent part of the vehicle body.

The latch member carrier 33 is permanently connected to the floor of the passenger compartment or is formed by the floor of the passenger compartment itself. This latch member carrier 33 has two opposing latch parts 3, each of which can work together with a latch assembly, wherein the two lock housings 31 form the legs of a motor vehicle seat. In other exemplary embodiments of the invention, the latch member carrier 33 has only a single opposing latch part. These other exemplary embodiments, which are not shown here, pertain to seatback latch assemblies, in which the latch member carrier can also be a part of the vehicle body or can be permanently connected to the body and in which the lock housing is part of the seatback. The relationships can also be reversed, however. That is, the lock can be permanently connected to the vehicle body, so that the lock housing then forms part of the body. Another exemplary embodiment (not shown) pertains to a door latch, in which the lock housing is either a permanent part of the frame or of the door or is formed by the door itself or by the frame itself.

All of the essential elements of the latch are mounted on a housing plate 29. This has a capture opening 30, which is designed as a slot with a bottom 30'. A latch member in the form of a rotary latch 1, which turns around a rotational axis 24, is mounted rotatably on the housing plate 29. A rotary latch spring is provided, which holds the rotary latch 1 in the open position. The rotary latch 1 forms a forked opening, which extends between a latch hook 2 and a rotary latch arm 17 and which is designed to accept an opposing latch part 3 forming a permanent part of the latch member carrier 33.

A tensioning member 4 is provided. The tensioning member 4 is designed as a slide plate. The slide plate slides in a direction parallel to that in which the opposing latch part is captured, indicated in FIG. 1 by an arrow. The tensioning member 4 has a slot 22, designed as an elongated hole; the width of the slot corresponds to the diameter of an extension 23, which engages in the slot 2. The extension 23 is formed by the shaft which supports the rotary latch 1 and has a circular peripheral contour.

The tensioning member 4 also forms a window 7, closed on all sides. The window 7, inside which a pin 8, permanently connected to the wide side of the rotary latch 1, travels, has essentially two sections. One section forms an escape space 19, which has the form of an arc of a circle and in which the pin 8 is located when the rotary latch 1 is in the open position shown in FIGS. 1 and 8. A tensioning cam 18 following the escape space 19 extends in a straight line and acts as one side of a wedge, because it extends at a slant to the direction in which the tensioning member 4, designed as a slide plate, moves. The tensioning member 4 is supported on a guide edge 21, which is a permanent part of the housing 31 or of the housing plate 29. The guide edge 21 extends in the direction in which the tensioning slide plate 4 moves, that is, at an angle to the tensioning cam 18.

A tension spring 5 is provided, one end of which acts on the tensioning member 4, while the other end is attached to a spring support 28 permanently connected to the housing. The tension spring 5 is pretensioned and is thus able to hold the tensioning slide plate 4 in the tensioning position shown in FIG. 6, in which the tensioning cam 18 is exerting tensioning force on the pin 8, so that torque is exerted on the rotary latch 1 when it is in the latching position. This torque is transmitted by the edge 2' of the latch hook 2 to the opposing latch part 3, so that, when the assembly is in the latching position, the tensioning edge 32 is pressed against the opposing tensioning edge 6.

A stop pawl 9 is provided, which is rotatably mounted on the housing plate 29 so that it can rotate around a pawl axis 25. The stop pawl 9 forms a stop hook 10, which, when the assembly is in the open position shown in FIG. 1, lies outside the capture opening 30. One end of a transmission rod 34 is hinged to a pin 27, while the other end of the rod is hinged to a pivot lever 35. When the rotary latch is in the open position (FIG. 1), a retaining means (not shown) holds the stop pawl 9 in a pivoted position such that a stop pawl spring (not shown) cannot move it, as a result of which the stop pawl 9 remains in the open position.

An indicator pin 37 is provided, which, when the stop pawl is in the opened state, passes through the housing to the outside. One end of the pivot lever 35 acts on the end of the indicator pin 37 located inside the housing. Because the pivot lever 35 is connected by a transmission rod 34 to the pin 27 on the stop pawl 9, the pivot lever 35 pivots together with the stop pawl 9. The pivoting movement of the pivot lever 35 is transmitted by a manipulation spring 36 to the indicator pin 37. The manipulation spring 36 sits on a pin 37, one end of the spring being supported on the indicator pin 37, whereas the other end acts on the free end of the pivot lever 35. When the rotary latch 1 pivots to capture the opposing latch part 3 (FIGS. 3-5), the retaining means which prevents the stop pawl 9 from pivoting under the force of the spring is released. In the latching position of the assembly (FIG. 6), the stop hook 10 extends under the stop edge 11, remaining a certain distance away from it. Until the stop pawl 9 moves into its released position, the rotary latch 1 cannot pivot into its open position, because, when the rotary latch 1 rotates slightly in the direction toward its open position, the stop edge 11 runs up against the stop hook 10.

An opening lever 13 is provided. The opening lever 13 has three lever arms 14, 15, 16 and is mounted on the housing plate 29 with freedom to pivot around the stop pawl pivot axis 25. A first opening lever arm 14 cooperates with an extension 12 of the tensioning member 4. A second opening lever arm 15, extending more-or-less at a right angle to this first lever arm, is used to rotate the opening lever 13. A Bowden cable, a handle, or a linkage can act on this second arm to shift the opening lever 15 in the counterclockwise direction away from the locking position shown in FIG. 6. The second lever arm 15 has yet another function. During the course of its rotational movement, it runs up against a driver pin 26, which projects from the wide side of the stop pawl 9, and thus also shifts the stop pawl 9 into its open position. A spring 39 acts on the third opening lever arm 16, which is essentially diametrically opposite the first lever arm 14; this spring holds the opening lever 13 in a non-actuated position and is put under tension when the opening lever 13 is turned in the opening direction. A Bowden cable, a handle, or a linkage can also act on the opening lever arm 16.

The way in which the latch assembly works is as follows:

In FIG. 1, the rotary latch 1 is held in the open position by the rotary latch spring. The stop pawl 9 is in its released position. The opening lever 13 is in its non-actuated position. The opening lever arm 14 is a certain distance away from the extension 12 of the tensioning member 4. The pin 8 is located in the escape space 19 and holds the tensioning member 4 in the released position.

Figure 2:
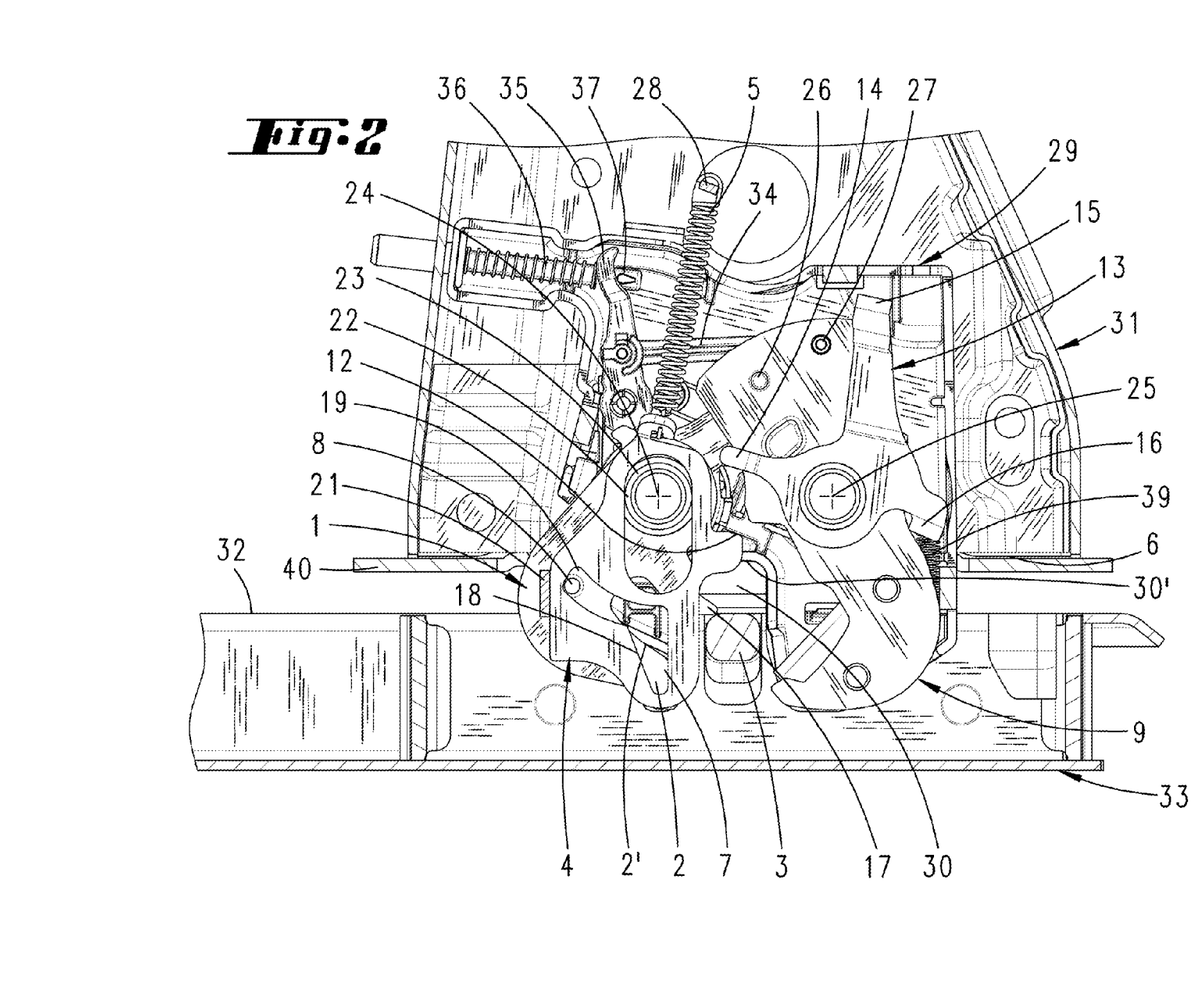
FIG. 2 shows a diagram similar to FIG. 1 in which the opposing latch part has been brought into a stop position against an arm 17 of the rotary latch.
Figure 3:
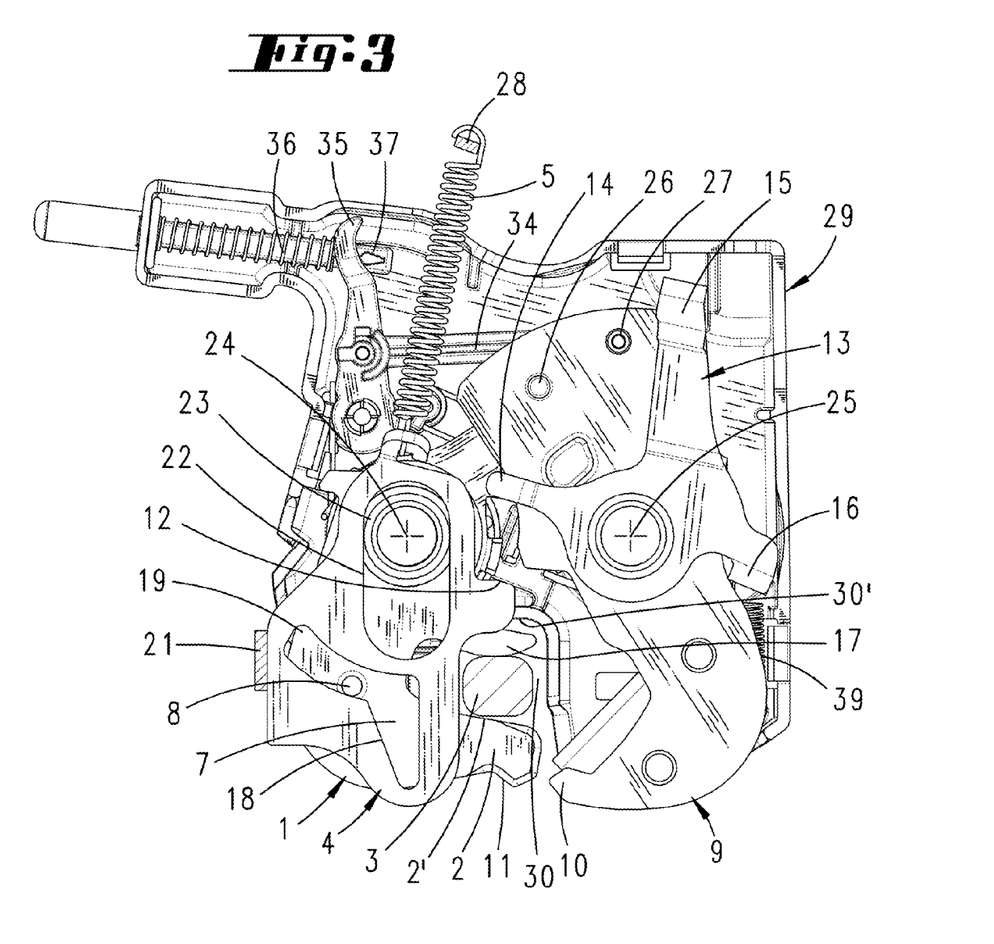
FIG. 3 shows a diagram subsequent to that of FIG. 1, in which the insertion movement of the opposing latch part 3 into the capture opening 30 in the housing plate 29 has led to a first displacement of the rotary latch 1, wherein the opposing latch part carrier 33 and the lock housing 31 have been omitted for the sake of clarity.

When the opposing latch part, which is permanently connected to the latch member carrier 33, now moves into the capture opening 30, it runs up against the tip of the rotary latch arm 17, which projects into the capture opening 30 (see FIG. 2) and pivots the rotary latch 1 into the position shown in FIG. 3. During this pivoting movement, the pin 8 travels along the curved retaining shoulder of the escape space 19 and holds the tensioning member 4 in its open position. As the opposing latch part 3 continues to move inward, the pin 8 travels past the end of the curved retaining edge of the escape space 19 (see FIG. 4) and thus reaches the tensioning cam 18 (see FIG. 5). Once this position is reached, the tension spring 5 goes into action; that is, by acting on the pin 8, it exerts torque on the rotary latch 1 by way of the cam edge 18, which extends at a slant to the direction in which the tensioning member 4 slides, with the result that the edge 2' of the latch hook 2 of the latch can exert force on the opposing latch part 3. As this is happening, the tensioning member 4 continues to move until it reaches the tensioning position shown in FIG. 6, in which the tensioning edge 32 of the latch member carrier 33 is pressed tightly against the opposing tensioning edge 6 of the lock housing 31.

Figure 4:
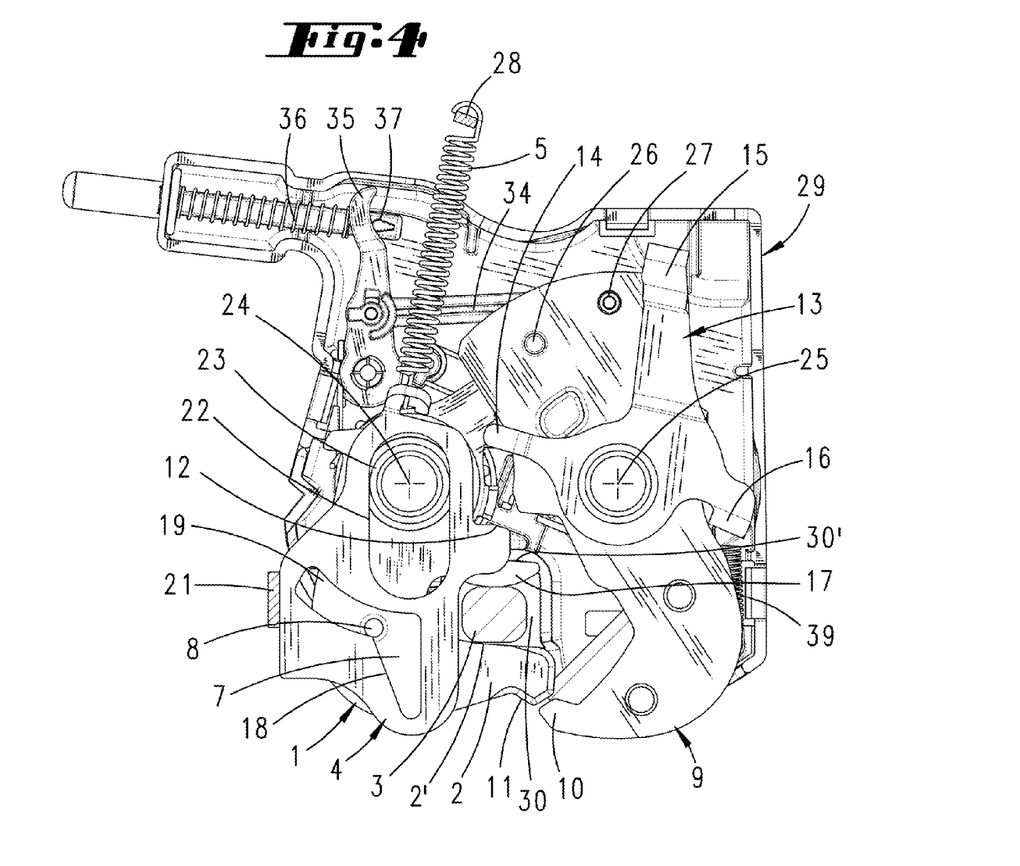
FIG. 4 shows a diagram subsequent to the preceding one, in which the rotary latch 1 has been rotated further and a projection 8 seated on the wide side of the rotary latch has reached the end of an escape space 19, the opposing latch part carrier 33 and the lock housing 31 again being omitted.

It can be derived from FIGS. 4 and 5 that, during the course of the capture movement of the opposing latch part 3, the stop pawl 9 shifts in the direction toward its stop position.

Figure 6:
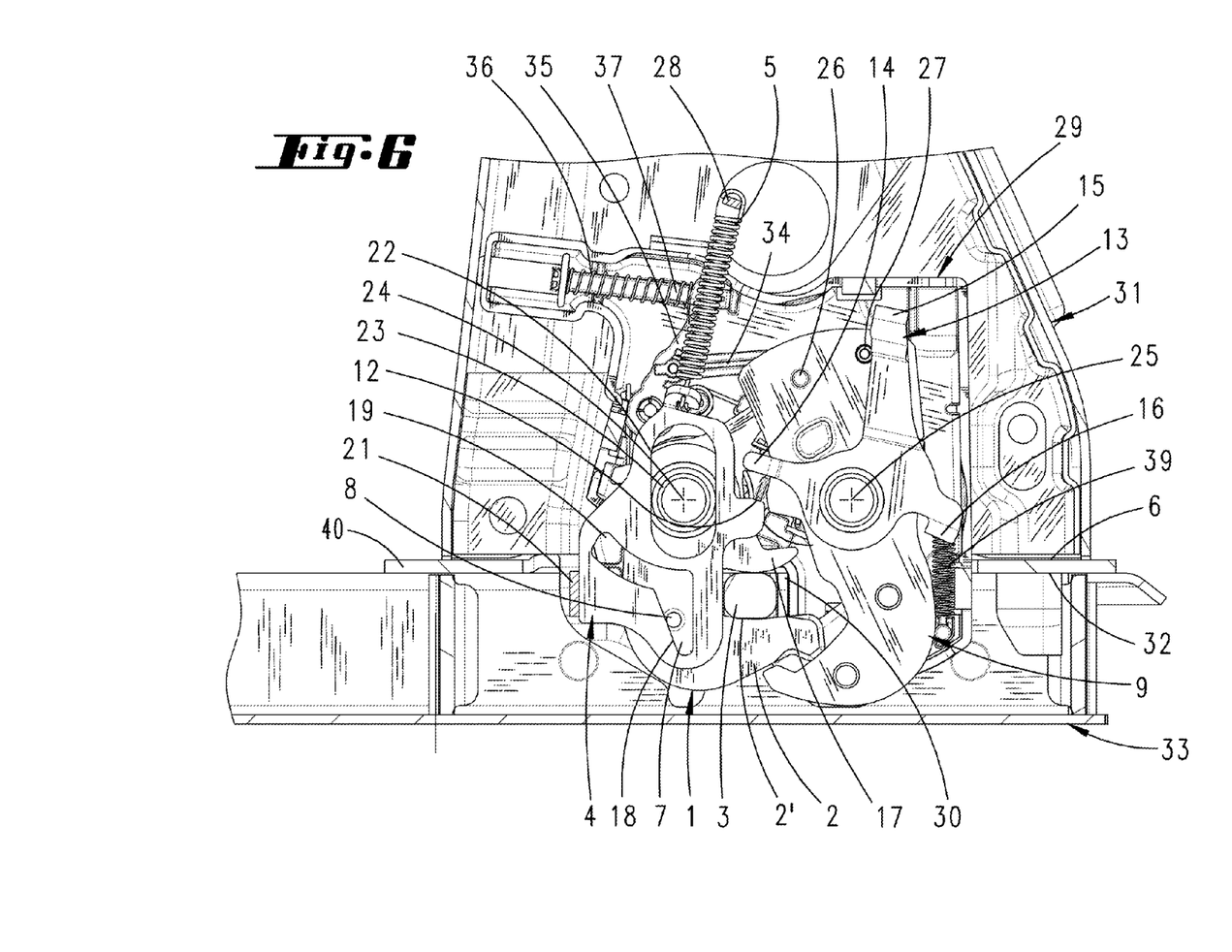
FIG. 6 shows a diagram subsequent to the preceding one, in which the pin 8 has been brought into its tensioning position, i.e., the position in which the tensioning member exerts a tensioning force on the opposing latch part 3 and thus exerts a tensioning surface 32 of the latch member carrier 33 against an opposing tensioning edge 6 of the lock housing 31.
Figure 7:
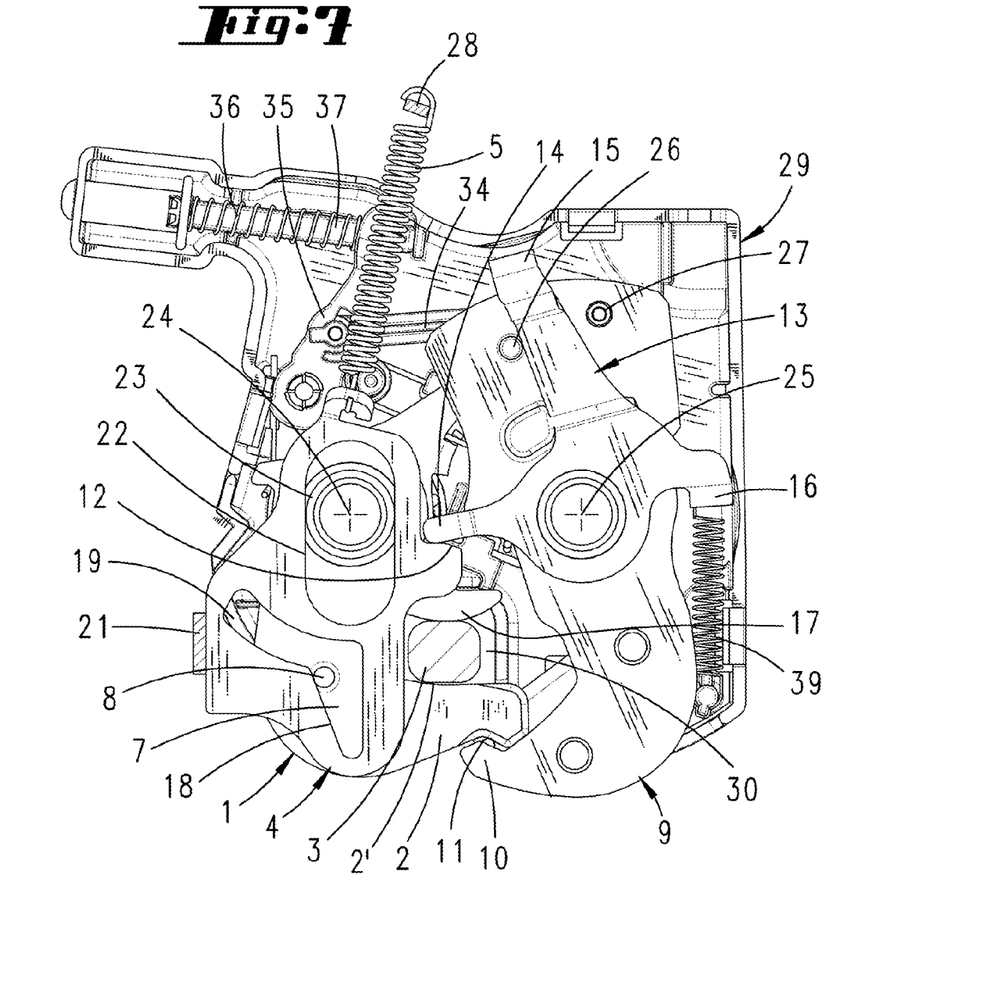
FIG. 7 shows a diagram subsequent to the preceding one after the occurrence of an opening actuation, during which an opening lever 13 has shifted the tensioning member 4 but not, as yet, the stop pawl 9, the opposing lock part carrier 33 and the lock housing 31 again being omitted.

To open the latch assembly, the opening lever 13 must be pivoted against the restoring force of the spring 39 by a Bowden cable or the like acting on the second lever arm 15, thus moving it from the position shown in FIG. 6 to the position shown in FIG. 7. In the locking position shown in FIG. 6, the first arm 14 is a short distance away from the extension 12. When the opening lever 13 is turned, the extension 12 is subject to the force of the first lever arm 14, and the tensioning member 4 is thus shifted, wherein, during the course of this movement of the tensioning member 4, the pin 8 moves along the tensioning cam 18 toward the escape space 19.

As it is pivoting into the open position, the second lever arm 15 runs up against the driver 26 of the stop pawl 9 and thus shifts the stop pawl 9 out of its stop position into the release position.

Figure 8:
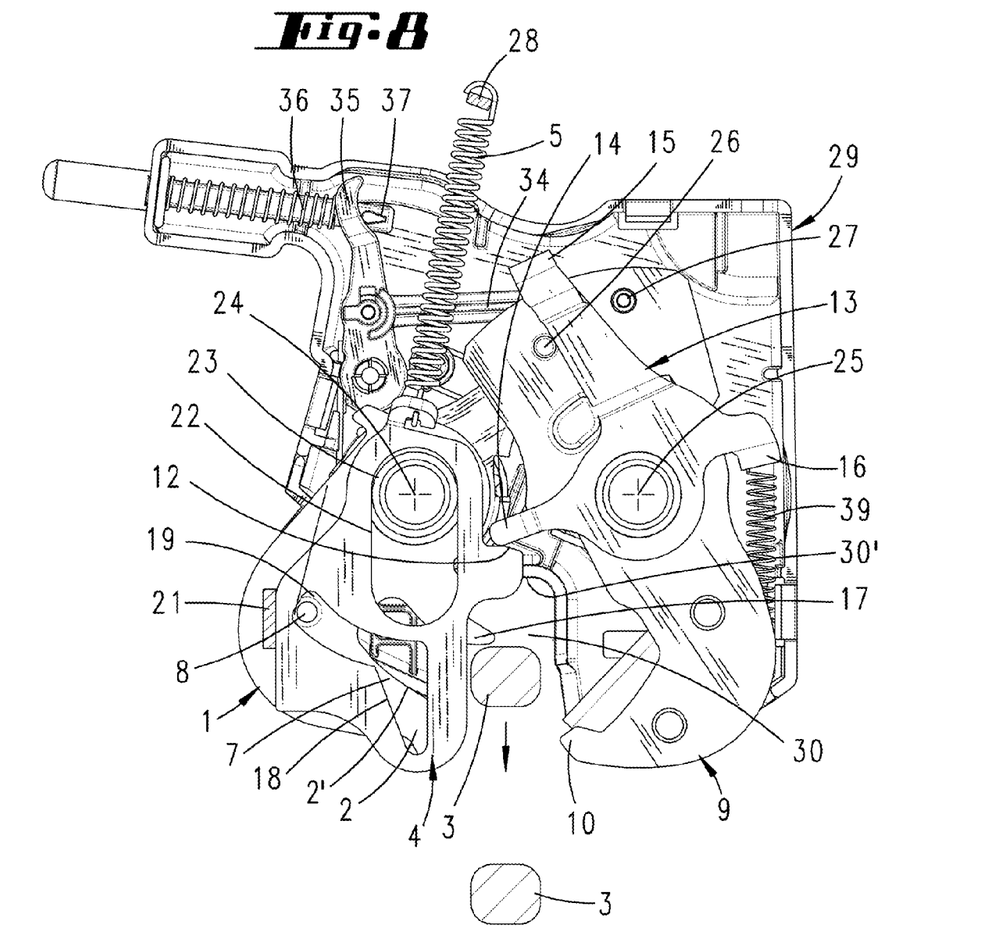
FIG. 8 shows another diagram subsequent to the preceding one, in which the opening lever 13 has brought both the tensioning member 4 and the stop pawl 9 into the released position, the opposing latch part carrier 33 and the lock housing 31 again being omitted.

As soon as the pin 8 travels past the end of the tensioning cam 18, it can enter the escape space 19, so that the rotary latch 1 can assume the open position shown in FIG. 8. In this position, the stop pawl 9 has been shifted completely into its released position, so that the opposing latch part 3 can move out of the capture opening 30 in the direction of the arrow indicated in FIG. 8.

In the exemplary embodiments which are not illustrated here, the stop parts can be designed in different ways. The rest position of the tensioning member can be achieved by means other than that of a window with a wedge-like contour. The effective force of the tensioning member can be realized not only by a tension spring but also by a compression spring or a leg spring.

All of the disclosed features are (in themselves) essential to the invention. The disclosure content of the associated/attached priority documents (copy of the prior application) is also included here in its entirety for the purpose, among others, of incorporating features of these documents into the claims of the present application. In their facultatively subordinate version, the subclaims characterize independent inventive elaborations of the prior art, in particular for the purpose of generating divisional applications on the basis of these claims.

While specific embodiments of the invention have been shown and described in detail to illustrate the inventive principles, it will be understood that the invention may be embodied otherwise without departing from such principles.

I claim:

1. A latch assembly for doors, seats, or seatbacks of motor vehicles, comprising:
   a lock housing;
   a latch element installed rotatably in the lock housing to retain an opposing latch part when the assembly is in a locking position, the opposing latch part being disconnectable from the latch element when the assembly is in a released position; and
   a tensioning member, which, when the assembly is in the locking position, exerts a tensioning force by which a tension edge forming a permanent part of the opposing latch part is pressed against an opposing tension edge forming a permanent part of the lock housing, wherein the tensioning member is a slide plate supported on a guide edge of the lock housing so that when the tensioning member shifts from a tensioning position to a release position the slide plate slides along the guide edge, which forms a permanent part of the lock housing, at least a certain area of the slide plate forming a tensioning cam that is at an angle relative to movement of the slide plate and cooperates with a projection on the latch element, further comprising a stop pawl having a stop hook that extends under a stop edge of the latch element when the assembly is in the locking position, and an opening lever having a first arm that, when subjected to an opening force, acts on an extension of the tensioning member to move the tensioning member into a released position, in which the projection can enter the escape space, wherein the opening lever has a second arm, which, when subjected to an opening force, acts on a driver on the stop pawl to move the stop pawl into a released position, in which the stop hook does not extend under the stop edge.

2. The latch assembly according to claim 1, wherein the slide plate slides in a direction parallel to a direction in which the opposing latch part is captured.

3. The latch assembly according to claim 2, the tensioning cam is a boundary edge of a window in the tensioning member, which window forms an escape space following after the cam, into which space the projection lies when the assembly is in the released position.

4. The latch assembly according to claim 2, wherein the tensioning member comprises a slot, in which a guide projection coaxial to a pivot axis of the latch element engages.

5. The latch assembly according to claim 4, wherein the guide projection is a hub of a rotary latch forming the latch element, the hub having a diameter equal to a width of the slot in the tensioning member.

6. The latch assembly according to claim 2, further comprising a tension spring that acts on a spring support forming a permanent part of the lock housing and on the tensioning member to produce a tensioning force.

7. The latch assembly according to claim 2, wherein the tension edge is assigned to a latch member carrier, and the opposing tension edge is an outside edge of the lock housing.

8. A latch assembly for doors, seats, or seatbacks of motor vehicles, comprising:
   a lock housing;
   a latch element installed rotatably in the lock housing to retain an opposing latch part when the assembly is in a locking position, the opposing part being disconnectable from the latch element when the assembly is in a released position; and
   a tensioning member, which, when the assembly is in the locking position, exerts a tensioning force by which a tension edge forming a permanent part of the opposing latch part is pressed against an opposing tension edge forming a permanent part of the lock housing, wherein at least a certain section of the tension edge is a substantially straight wall of a latch member carrier, and the opposing tension edge is a wall of the lock housing extending parallel to the tension edge, wherein the tensioning member is a slide plate supported on a guide edge that is a permanent part of the lock housing and is slideable along the guide edge when the tensioning member shifts from the locking position to a released position, the slide plate having a tensioning cam that cooperates with a projection on the latch element, further comprising a stop pawl having a stop hook that extends under a stop edge of the latch element when the assembly is in the locking position, and an opening lever having a first arm that, when subjected to an opening force, acts on an extension of the tensioning member to move the tensioning member into a released position, in which the projection can enter the escape space, wherein the opening lever has a second arm, which, when subjected to an opening force, acts on a driver on the stop pawl to move the stop pawl into a released position, in which the stop hook does not extend under the stop edge.

* * * * *